United States Patent
Brown et al.

(10) Patent No.: US 8,122,707 B2
(45) Date of Patent: Feb. 28, 2012

(54) INJECTION ANTI-COKING SYSTEM FOR PARTICULATE FILTERS

(75) Inventors: David B. Brown, Brighton, MI (US);
Michael J. Paratore, Jr., Howell, MI (US)

(73) Assignee: GM Global Technology Operations LLC

(*) Notice: Subject to any disclaimer, the term of this patent is extended or adjusted under 35 U.S.C. 154(b) by 1008 days.

(21) Appl. No.: 12/055,368

(22) Filed: Mar. 26, 2008

(65) Prior Publication Data

US 2008/0295496 A1 Dec. 4, 2008

Related U.S. Application Data

(60) Provisional application No. 60/932,927, filed on Jun. 1, 2007.

(51) Int. Cl.
*F01N 3/00* (2006.01)
*F01N 3/10* (2006.01)

(52) U.S. Cl. ............... 60/286; 60/274; 60/277; 60/295; 60/303

(58) Field of Classification Search ............ 60/274, 60/277, 286, 295, 297, 303, 311; 95/276, 95/278, 279, 283
See application file for complete search history.

(56) References Cited

FOREIGN PATENT DOCUMENTS

| CN | 1771382 A | 5/2006 |
|---|---|---|
| JP | 2005106047 A | 4/2005 |
| WO | WO2005/088088 | 9/2005 |

*Primary Examiner* — Thomas Denion
*Assistant Examiner* — Audrey K Bradley

(57) ABSTRACT

A system comprising an injector for injecting fuel directly into the exhaust system. A control module supplies fuel using the injector to burn particulate matter in the particulate filter when the control module determines that regeneration is needed. The control module selectively supplies fuel to exercise the injector during periods when the control module determines that regeneration is not needed.

6 Claims, 4 Drawing Sheets

INJECTION ANTI-COKING SYSTEM FOR PARTICULATE FILTERS

CROSS-REFERENCE TO RELATED APPLICATIONS

This application claims the benefit of U.S. Provisional Application No. 60/932,927, filed on Jun. 1, 2007. The disclosure of the above application is incorporated herein by reference in its entirety.

FIELD

The present disclosure relates to anti-coking control systems for vehicles that perform regeneration using fuel injectors that inject fuel into the exhaust system.

BACKGROUND

The statements in this section merely provide background information related to the present disclosure and may not constitute prior art.

Engines such as diesel engines produce particulates that are typically filtered from exhaust gas by a particulate filter (PF). The PF is disposed in an exhaust system of the engine. The PF reduces emission of particulate matter that is generated during combustion. Over time, the PF becomes full and the trapped particulate matter needs to be removed. During regeneration, the particulate matter is burned within the PF.

An engine control system can estimate accumulation of the particulate matter and determine when the filter needs regeneration. Once regeneration is needed, the control system enables regeneration by injecting fuel into the exhaust system. The heat released during combustion of the injected fuel in the diesel oxidation catalyst increases the exhaust temperature, which burns the trapped particulate matter in the PF. In some systems, the injectors of the engine are used to increase fuel by temporarily enriching the air/fuel mixture. The excess fuel in the exhaust gas after combustion is used to increase the temperature of the PF.

Other systems use a fuel injector that is separate from the injectors associated with the fuel system. The injector injects fuel into the exhaust system. Performance issues may arise due to coking or deposit formation in fuel injection devices that are exposed to exhaust conditions. As a result, the fuel injection devices may experience poor durability.

SUMMARY

A system comprises an injector for injecting fuel directly into an exhaust system. A control module supplies fuel using the injector to burn particulate matter in the particulate filter when the control module determines that regeneration is needed. The control module selectively supplies fuel to exercise the injector during periods when the control module determines that regeneration is not needed.

In other features, an exhaust temperature sensor senses an exhaust temperature. A timer determines a period since a last injection using the at least one second injector. A degradation module determines degradation of the at least one second injector based on the exhaust temperature and the period since a last injection using the at least one second injector. The control module selectively enables exercise of the at least one second injector based on enabling conditions. The enabling conditions include at least one of exhaust temperature, engine mode, and a period since a last use of the at least one second injector.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
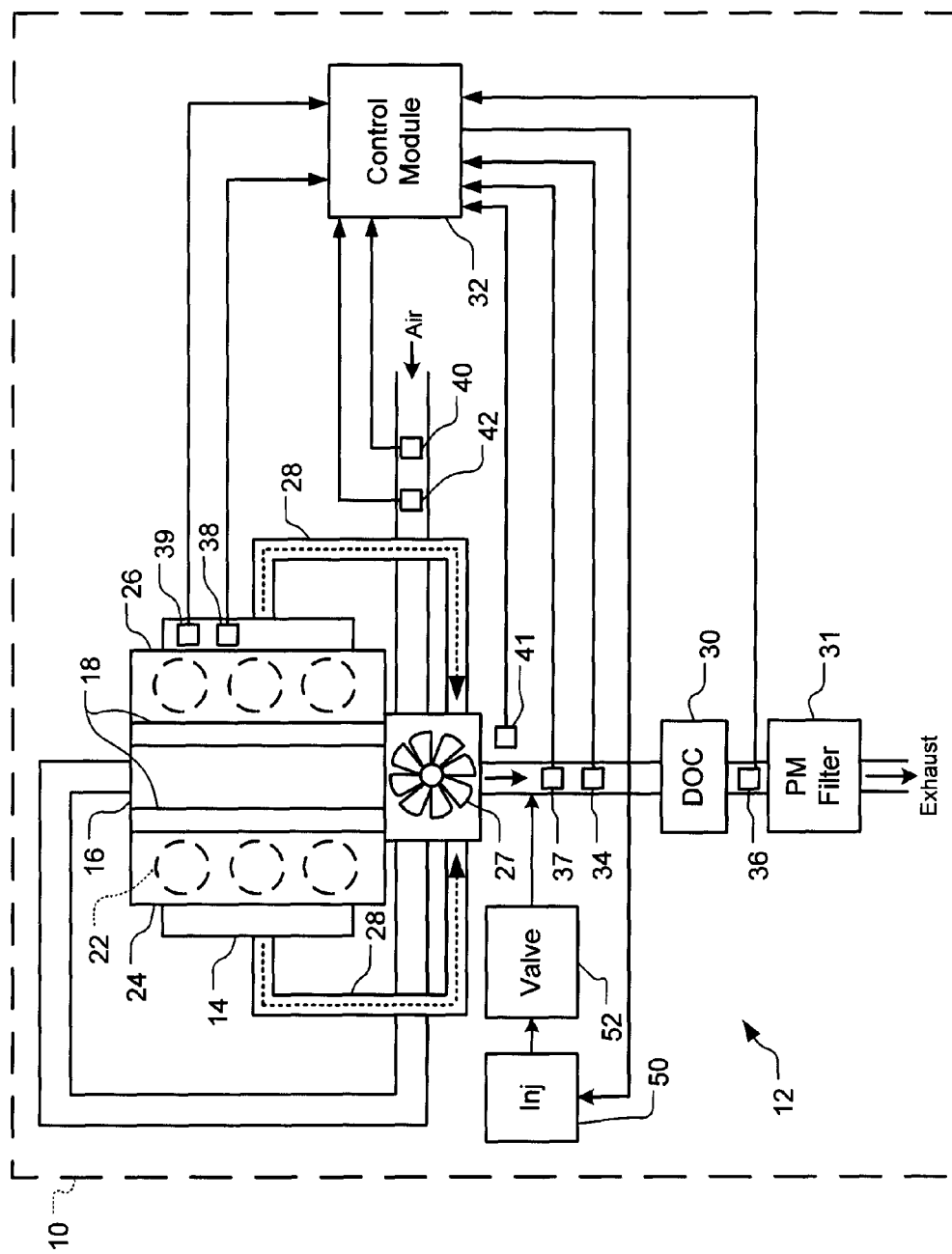
FIG. 1 is a functional block diagram of an exemplary engine system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Coking and deposit formation described herein may be particularly challenging with fuel injection devices that are exposed to exhaust conditions and that are used relatively infrequently. For these fuel injection devices, there may be time intervals of inactivity where residual fuel oxidation and polymerization may occur.

For example, injection devices may be used to facilitate or assist diesel particulate filter (PF) regeneration. The regeneration interval may be infrequent. For example only, the regeneration interval can be as long as several hundred miles. For example only, the injector device may be operated only when needed. Typically, the injector may be used about 15-30 minutes every 8-10 operating hours. The regeneration intervals described above provide time periods during which deposit formation or fuel coking issues may occur.

The present disclosure reduces deterioration of fuel injection devices used in the exhaust systems of automotive products. The present disclosure monitors and models the conditions in the vehicle exhaust system. The present disclosure determines an appropriate schedule for the fuel injection system to exercise the injector that will minimize fuel consumption and emission control issues while improving fuel injection system durability. As a result, lower cost hardware and fuel injection components may be used. As can be appreciated, while the present disclosure describes a diesel engine application, the present disclosure may also be applied to internal combustion engines with a particulate filter as well as Hydrocarbon (HC) Selective Catalyst Reduction (SCR).

Referring now to FIG. 1, a vehicle 10 includes an engine control system. The engine control system 12 includes an engine 14, an intake manifold 16, a common rail fuel injection system 18 and a turbocharger 27. The engine 14 includes six cylinders 22 configured in adjacent cylinder banks 24 and 26 and in a V-type layout. Although FIG. 1 depicts six cylinders 22, it can be appreciated that the engine 14 may include additional or fewer cylinders 22. For example, engines having 2, 3, 4, 5, 8, 10, 12 and 16 cylinders are contemplated. It is also anticipated that the engine 14 can have an inline-type cylinder configuration. While a turbocharged diesel engine is shown, the present disclosure also applies to other engines such as naturally aspirated or supercharged engines.

Air is drawn into the intake manifold 16 by the inlet vacuum created by an engine turbocharger 27. Air is ducted into the individual cylinders 22 from the intake manifold 16 and is compressed therein. Fuel is injected by the common rail injection system 18 and the heat of the compressed air ignites the air/fuel mixture. Exhaust gas is exhausted from the cylinders through exhaust conduits 28. The exhaust gas drives the turbocharger 27, which delivers additional air into the cylinders 22 for combustion.

The exhaust gas enters a diesel oxidation catalyst (DOC) 30, which facilitates chemical reactions with excess fuel in the exhaust gases. Exhaust gases from the DOC 30 pass through a particulate matter (PM) filter 31, which extracts PM from the exhaust stream. The exhaust gases exit the PM filter 31.

A control module 32 controls operation of the engine control system 12. More specifically, the control module 32 controls engine system operations based on various parameters. For example, the control module 32 may be implemented in an engine control module (ECM), a vehicle computer, or may be an independent controller.

The control module 32 may also perform engine system diagnostics. For example, the control module 32 may verify proper operation of the DOC 30. Additionally, the control module 32 may initiate a post-fuel injection process to heat the exhaust gases to the PM filter 31 by oxidizing fuel in the DOC 30. The control module 32 may receive a temperature signal from an inlet temperature sensor 34 that senses the temperature of exhaust gases at the opening of the DOC 30. The control module 32 may also receive a temperature signal from an outlet temperature sensor 36 that senses the temperature of exhaust gases that exit the DOC 30. The control module 32 may receive a pressure signal from an exhaust pressure sensor 37 that senses the air pressure in the exhaust system.

The control module 32 may receive a speed signal from a speed sensor 38 in the engine 14. The control module 32 may receive a temperature signal from an engine coolant sensor 39 that senses a temperature of coolant in the engine 14. The control module 32 may receive a temperature signal from an inlet air temperature sensor 40 that detects an inlet air temperature of the engine 14. The control module 32 may receive a pressure signal from an ambient pressure sensor 41 that senses a pressure of the air outside of the engine 14. The control module 32 may receive an airflow signal from a mass airflow sensor 42 that detects a rate that air flows into the engine 14. Still other inputs may be provided.

At various times, the control module 32 sends a command to an injector 50 to inject fuel into the exhaust system. A valve 52 such as a poppet valve may be used. The control module 32 may command fuel when regeneration of the PF 31 is needed. The control module 32 may also command fuel when regeneration is not needed to exercise the injector 50.

Figure 2:
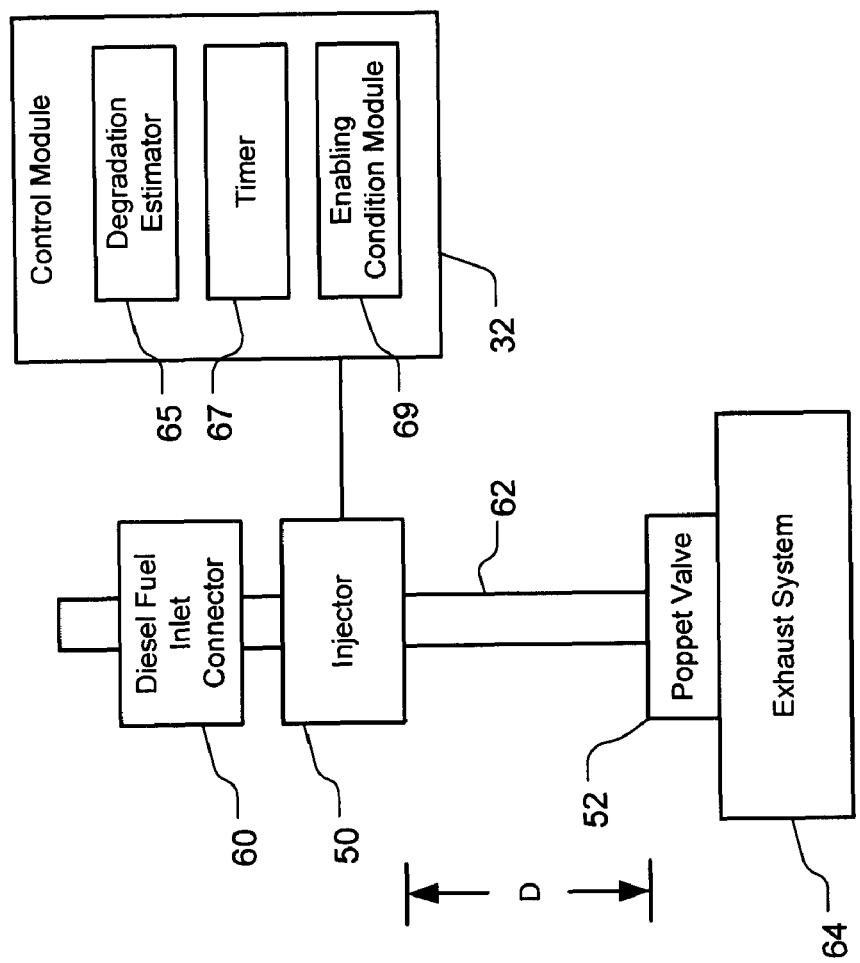
FIG. 2 is a functional block diagram of a regeneration system according to the present disclosure.

Referring now to FIG. 2, a conduit from a supply of fuel may supply fuel to the injector 50. Another conduit 62 may connect an output of the injector to the valve 52, which is arranged adjacent to the exhaust system. The valve 52 and the injector 50 may be spaced a distance D that is sufficient to allow cooling and to prevent damage to the injector 50 due to high exhaust gas temperatures.

Figure 3:
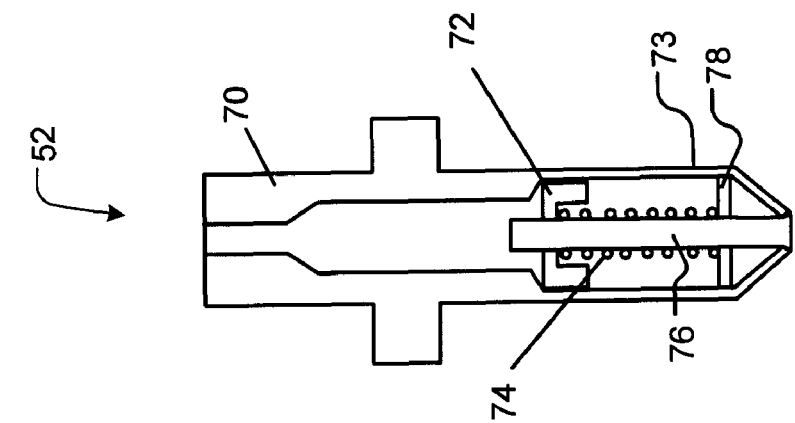
FIG. 3 illustrates an exemplary regeneration injector.

Any suitable valve or injector may be used including a low spray nozzle valve or injector such as the one shown in FIG. 3. In FIG. 3, an exemplary valve 52 is shown. For example only, the valve 52 may include an upper housing 70, an upper guide 72, a valve body 73, a spring 74, a needle 76 and a lower guide 78.

Figure 4:
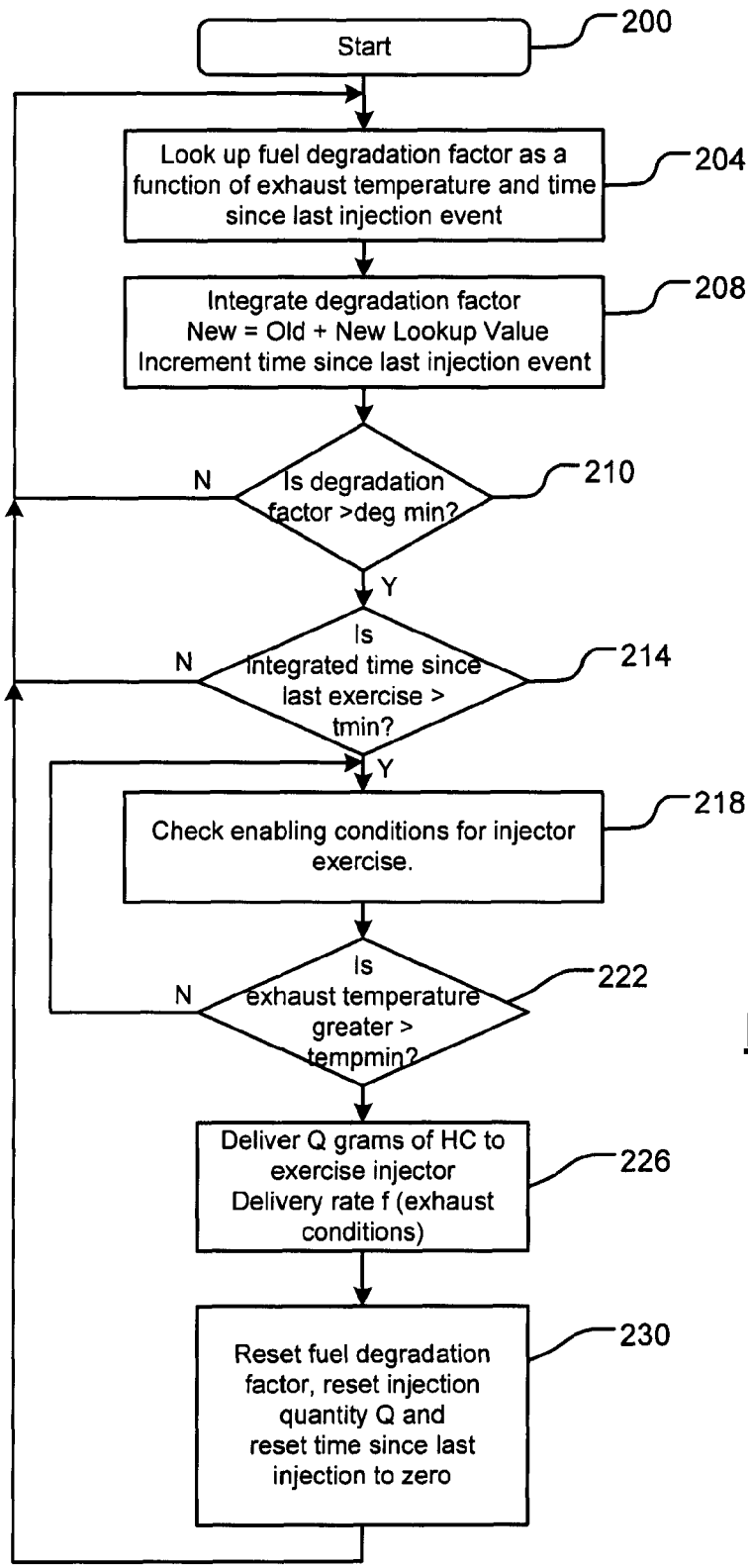
FIG. 4 illustrates a method for reducing coking deposits.
Figure 5:
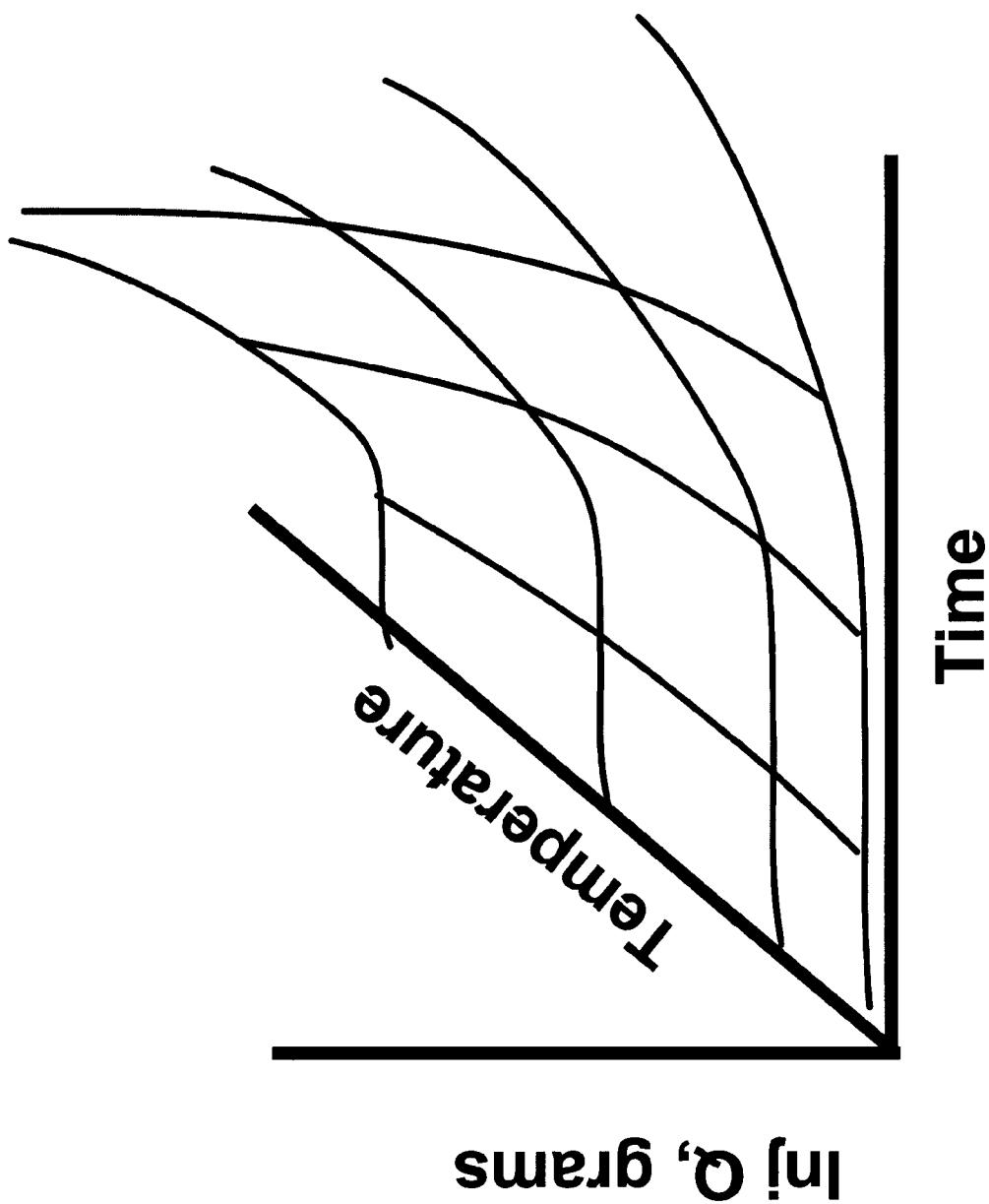
FIG. 5 illustrates injection quantity as a function of temperature and time.

Referring now to FIGS. 4 and 5, control begins in step 200. In step 204, control looks up a fuel degradation factor as a function of exhaust temperature and a period since last injection event. For example, an exemplary relationship between injection amount, time and temperature is shown in FIG. 5. In step 208, the degradation factor is integrated. A new degradation factor is set equal to an old degradation factor plus a new lookup value. The time since the last injection is incremented.

In step 210, control determines whether the degradation factor is greater than a degradation minimum. If false, control returns to step 204. Otherwise control continues with step 214. In step 214, control determines whether the time or the integrated time since last exercise is greater than a predetermined period tmin. If false, control returns to step 204. Otherwise control continues with step 218 and checks enabling conditions for injector exercise. Exemplary enabling conditions include exhaust temperature, ambient temperature and catalyst temperature. Other exemplary enabling conditions may be based on an engine operating mode.

Control continues from step 218 and control determines whether the exhaust temperature is greater than a predetermined temperature tempmin in step 222. If step 222 is false, control returns to step 218. If step 222 is true, control delivers a predetermined amount of fuel (such as Q grams) to exercise the injector (despite the fact that regeneration is not needed). Control continues with step 230 and fuel degradation factor, injector quantity, and time since last injection to zero. Control continues with step 204.

This approach provides an optimal balance between durability, fuel consumption, and emission control. This control approach reduces coking by exercising the injector during the period in time when it is normally not used or needed. The frequency of exercise is dependent on operating time, temperature, and exhaust flow rate, among other items. Exercise is more frequent under particularly challenging conditions. Total fuel use and emission impact are negligible, while improving durability of the injection device.

What is claimed is:

1. A system comprising:
an injector for injecting fuel directly into an exhaust system;
a control module that supplies fuel to said exhaust system using said injector to burn particulate matter in a particulate filter when said control module determines that regeneration is needed and that selectively supplies fuel to exercise said injector during periods when said control module determines that regeneration is not needed;
an exhaust temperature sensor that senses an exhaust temperature;
a timer that determines a first period since a last injection using said injector; and
a degradation module that determines degradation of said injector based on said exhaust temperature and said first period.

2. The system of claim 1 wherein said control module selectively enables injection of fuel during said periods using said injector based on enabling conditions.

3. The system of claim 2 wherein said enabling conditions are based on exhaust temperature, engine mode, and a first period since a last use of said injector.

4. A method comprising:

providing an injector that injects fuel directly into an exhaust system;

supplying fuel to said exhaust system using said injector to burn particulate matter in a particulate filter when a control module determines that regeneration is needed;

selectively supplying fuel to exercise said injector during periods when said control module determines that regeneration is not needed;

sensing an exhaust temperature;

determining a first period since a last injection using said injector; and determining degradation of said injector based on said exhaust temperature and said first period.

5. The method of claim 4 further comprising selectively enabling injection of fuel using said injector during said periods based on enabling conditions.

6. The method of claim 5 wherein said enabling conditions include exhaust temperature, engine mode, and a first period since a last use of said injector.

* * * * *